(No Model.)
E. H. JOHNSON.
DEVICE FOR CONVERTING MOTION.
No. 504,086. Patented Aug. 29, 1893.
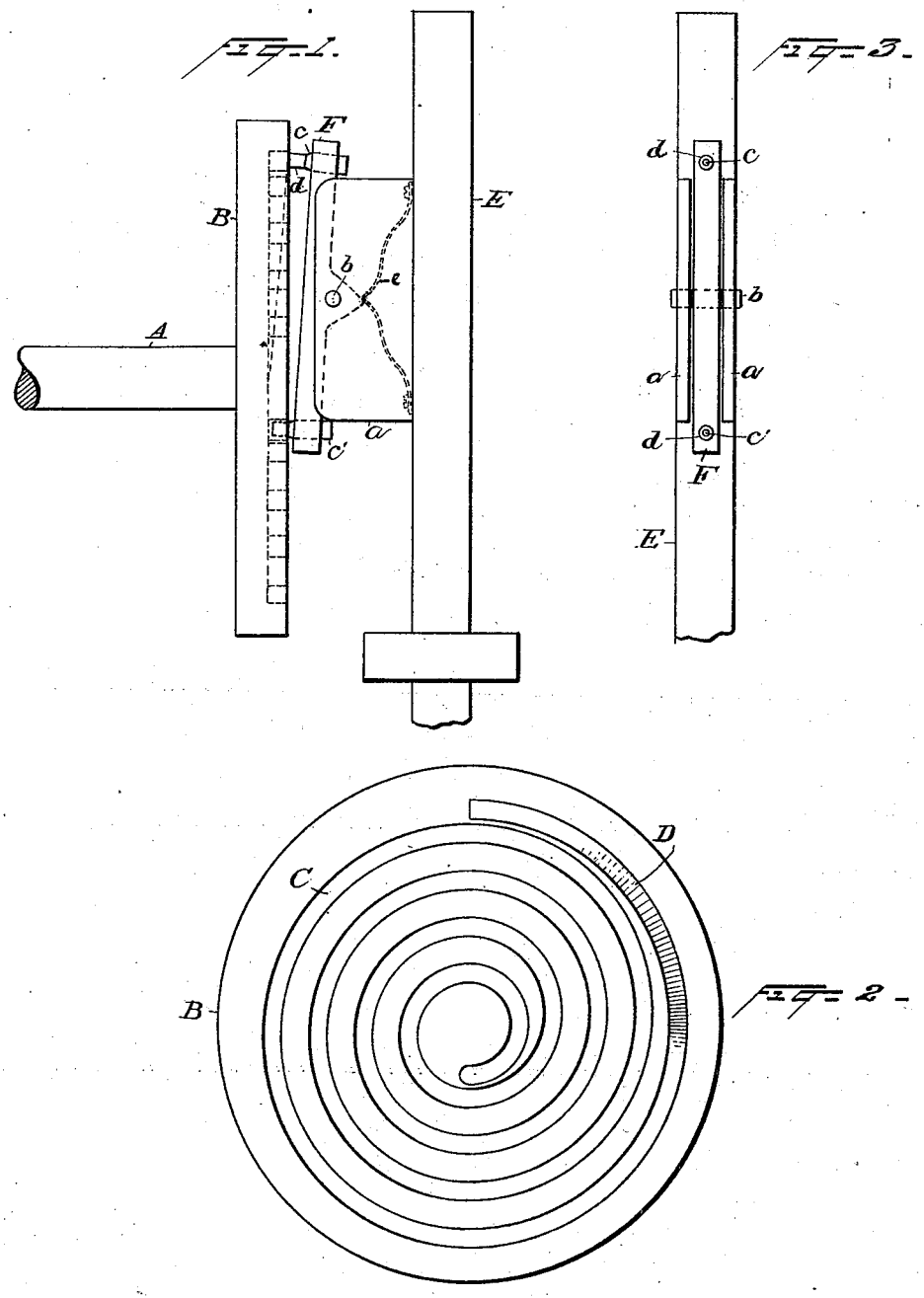

UNITED STATES PATENT OFFICE.

EDWARD H. JOHNSON, OF NEW YORK, N. Y.

DEVICE FOR CONVERTING MOTION.

SPECIFICATION forming part of Letters Patent No. 504,086, dated August 29, 1893.

Application filed December 1, 1892. Serial No. 453,725. (No model.)

*To all whom it may concern:*

Be it known that I, EDWARD H. JOHNSON, a citizen of the United States, residing at New York city, in the county and State of New York, have invented a certain new and useful Improvement in Devices for Converting Motion, of which the following is a specification.

The object of my invention is to provide a simple and economical gearing or power transmitting connection by means of which a rotary movement of high speed of a driving part may be converted into a reciprocating movement of slow speed of a driven part with the expenditure of a minimum amount of power in transmission.

In carrying my invention into effect I place upon or in connection with the rotating part, a spiral guide, and upon or in connection with the reciprocating part, a projection which engages with the spiral guide alternately first at one side of its center and then at the other, so that the revolution of the spiral guide moves the reciprocating part first in one direction and then in the other. The projection on the reciprocating part I preferably make in the form of a pivoted plate or block which rocks on its pivot and carries two studs one on each side of the pivot. The spiral guide is provided at its end with a cam or inclined surface, which when it is reached by the stud which is in engagement at the time pushes that stud back and so moves the other forward into engagement, whereby the continued rotary movement of the guide in the same direction causes the reciprocation of the part carrying the studs.

In the accompanying drawings: Figure 1 is a side elevation of a gearing embodying my invention; and Fig. 2 a face view of the spiral guide; and Fig. 3 a face view of the reciprocating part.

Upon the rotating shaft A, driven by any suitable power, is fixed a disk B in the face of which is formed a spiral groove C. This groove forms an eccentric spiral except near its ends where for about half a turn from each end the groove is made to gradually become a concentric one. At the outer end of the groove it terminates in a gradual inclined plane D rising to the surface level of the disk.

E is the reciprocating part which may be a pump rod or the reciprocating part of any machine. Secured to said rods are lugs or brackets $a\ a$ between which is pivoted at $b$ a plate or block F, which carries at one end a stud $c$ and at the other a stud $c'$, these studs being suitably secured to F and each carrying upon it a loose roller $d$ or $d'$. A flat spring $e$ secured to E behind the pivot $b$ engages the plate F as shown and serves to hold it in either of its two positions. Now with the parts in the position shown in Fig. 1, that is to say, with the stud $c'$ engaging with the spiral groove below the center thereof and the stud $c$ out of engagement, it is evident that the rotation of disk B (to the left as in Fig. 2) will cause the stud $c'$ to traverse the groove and to ride down toward the bottom of the plate carrying the reciprocating part E. When the stud $c'$ reaches the inclined plane or cam D it is pushed back and the stud $c$ is pushed forward until with the assistance of the spring $e$ the stud $c'$ is thrown out of engagement with the disk and the stud $c$ which has now reached a point on the spiral a little above its center is brought into engagement at that point and as the disk continues to revolve in the same direction this stud is now caused to ride upwardly and the reverse motion of the reciprocating part is obtained. By making the spiral groove become a concentric one at its ends the work performed by the traveling projection is gradually removed from it as it approaches the end of each stroke so that the change from one position to the other is made when there is no work on the gearing. Since the duration of each stroke of the reciprocated part depends upon the number of turns in the spiral, it is evident that only a single stroke is obtained for a considerable number of revolutions of the driving part and therefore that a high speed of rotation of the driver results in a slow reciprocation of the driven. If the rotating part is accidentally started in the wrong direction, no effect will be produced on the driven apparatus since the stud which in engagement will simply run to the center of the spiral and the latter will turn without moving the pin. The friction in the apparatus is merely that of the stud upon one side of the spiral groove and is so slight as to result in a minimum loss of power in transmission.

What I claim is—

1. The combination with a rotating driving part provided with a spiral guide, of a reciprocating driven part having a projection which engages said spiral alternately at one side and the other of its center, substantially as set forth.

2. The combination with a shaft, of a disk on said shaft provided with a spiral groove in its face and a reciprocating driven part having a projection which engages said groove alternately at one side or the other of its center, substantially as set forth.

3. The combination with a rotating driving part provided with a spiral guide, of a reciprocating driven part, and a body pivoted on said driven part and provided with two studs one on each side of its pivot, said studs being in position to alternately engage the spiral guide, substantially as set forth.

4. The combination with the body pivoted upon the reciprocating part and carrying the alternately engaging studs, of the spiral guide on the rotating part, provided with a cam or inclined plane at its end, substantially as set forth.

5. The combination with the body pivoted upon the reciprocating part and carrying the alternately engaging studs, of the spiral guide on the rotating part, the same being an eccentric spiral except near its ends where its curves become concentric ones, substantially as set forth.

This specification signed and witnessed this 23d day of November, 1892.

EDWARD H. JOHNSON.

Witnesses:
 W. E. MANDELICK,
 EUGENE CONRAN.